(12) United States Patent
Hirai et al.

(10) Patent No.: US 7,452,136 B2
(45) Date of Patent: Nov. 18, 2008

(54) BEARING APPARATUS FOR A WHEEL OF VEHICLE

(75) Inventors: Isao Hirai, Shizuoka-ken (JP);
Takayasu Takubo, Shizuoka-ken (JP);
Kazuhiko Yoshida, Shizuoka-ken (JP)

(73) Assignee: NTN Corporation (JP)

( * ) Notice: Subject to any disclaimer, the term of this patent is extended or adjusted under 35 U.S.C. 154(b) by 0 days.

(21) Appl. No.: 10/864,948

(22) Filed: Jun. 10, 2004

(65) Prior Publication Data
US 2004/0252927 A1    Dec. 16, 2004

(30) Foreign Application Priority Data
Jun. 11, 2003    (JP)    ............... 2003-166068

(51) Int. Cl.
*F16C 19/08* (2006.01)
(52) U.S. Cl. .................................... 384/544
(58) Field of Classification Search ................ 384/544, 384/589
See application file for complete search history.

(56) References Cited
U.S. PATENT DOCUMENTS 6,280,093 B1 *  8/2001  Ohtsuki et al. .............. 384/589
6,280,096 B1 *  8/2001  Miyazaki et al. ............ 384/544
6,523,909 B1 *  2/2003  Nakamura et al. .......... 384/544
6,969,201 B2 * 11/2005  Tajima ........................ 384/544

FOREIGN PATENT DOCUMENTS
JP     2002-87008     3/2002

* cited by examiner

*Primary Examiner*—Thomas R Hannon
(74) *Attorney, Agent, or Firm*—Harness, Dickey & Pierce, P.L.C.

(57) ABSTRACT

A vehicle wheel bearing apparatus which can increase the strength and durability of the hub wheel under rotary bending conditions as well as lighten the apparatus without changing the configuration and dimension of the wheel mounting flange and without causing surface run-out has an outer member formed with double row outer raceway surfaces on its inner peripheral surface. An inner member is formed with double row inner raceway surfaces arranged opposite to the double row outer raceway surfaces. Double row rolling elements are freely rollably contained between the outer and inner raceway surfaces, respectively, of the outer and inner members. A wheel mounting flange is integrally formed with either one of the outer or inner members. At least one of the outer and inner members, on which the wheel mounting flange is formed, is heat treated and their raceway surfaces are hardened by quenching to a predetermined surface hardness.

14 Claims, 5 Drawing Sheets

PRIOR ART

PRIOR ART

BEARING APPARATUS FOR A WHEEL OF VEHICLE

CROSS-REFERENCE TO RELATED APPLICATIONS

This application claims priority to Japanese Patent Application No. 2003-166068, filed Jun. 11, 2003, which application is herein expressly incorporated by reference.

FIELD OF THE INVENTION

The present invention relates to a vehicle wheel bearing apparatus, such as an automobile, and, more particularly, to a bearing apparatus with a wheel hub having improved strength and durability under rotary bending conditions.

BACKGROUND OF THE INVENTION

The bearing apparatus for a vehicle wheel includes various types in accordance with applications for driven as well as driving wheels. For example, a conventional bearing apparatus for a vehicle driving wheel is shown in FIG. 5. The apparatus includes an inner member 50, a wheel hub 51, an inner ring 52, double row rolling elements 53 and 54, an outer member 55, and a constant velocity universal joint 56. The constant velocity universal joint transmits an engine output to the wheel hub 51. In such a bearing apparatus for a driving wheel, the wheel hub 51 that supports a wheel (not shown) and a brake rotor 57 is made of medium carbon steel, such as S53C, for its ease of forging, cutting, heat treatment and economy in production. The wheel hub 51 and the wheel mounting flange 58 are ribbed and thinned to make them small and light to improve fuel consumption as well as driving stability. However, since the mechanical strength of such a miniaturized wheel hub 51 itself nears the fatigue limit of the medium carbon steel forming the wheel hub 51, it is difficult to further proceed with the miniaturization and lightening of the wheel hub 51.

In the wheel hub 51, where the wheel mounting flange 58 is thinned for weight purposes, special countermeasures are required to deal with the concentration of rotary bending stress at a corner 61 extending from a brake rotor mounting surface 59 toward a cylindrical pilot portion 60. Although it is possible to reduce the generated stress by enlarging the dimension of the corner 61, by increasing the radius of curvature, it is also limited by interference due to the to be mounted brake rotor 57.

The applicant of the present application has proposed a vehicle wheel bearing apparatus which increases the strength of the wheel hub 51 as well as lightening it without changing the configuration and dimension of the wheel mounting flange 58. In this bearing apparatus, as shown in FIG. 4, the corner 61 of the flange 58 of the wheel hub 51 is formed with a surface hardened layer 62 by high frequency induction hardening. This strengthens the corner 61 of the flange 58 where the rotary bending strength is weakened most and thus increases the durability of the wheel hub 51.

Portions other than the corner 61, such as a seal land portion where a seal lip is fitted into the outboard side end of the outer member 55 (not shown in FIG. 4) as well as portions "a"~"d" are also formed with a surface hardened layer 63. In addition, a serrated portion 64 is formed with a surface hardened layer 65. Thus the rotary bending strength, wear resistance and rolling fatigue life required for these portions "a"~"d" can be improved. See: Japanese Laid-open Patent Publication No. 87008/2002 (pages 4 and 5 and FIG. 2).

Although it is possible, according to the bearing apparatus for a prior art vehicle wheel, to increase the strength of the hub wheel 51 as well as to lighten it without changing the configuration and dimension of the wheel mounting flange 58, by forming the surface hardened layer 62 at the corner 61 of the flange 58, new problems occur. One problem is that the wheel mounting flange 58 is deformed by heat treatment in the high frequency induction hardening step. Thus, a large run-out surface is created in the brake rotor mounting surface 59. The problem of surface run-out is also caused by thinning the wheel mounting flange 58. The surface run-out of the brake rotor mounting surface 59 influences the run-out of the brake rotor 57. This causes brake judder which impairs the driving stability and the driving feeling. In this case, although it is conceivable to further cut the brake rotor mounting surface 59 by lathe turning after heat treatment of the wheel hub 51 to modify the deformed portion to improve the surface run-out, there also remains a dilemma that a slight step is caused between the surface hardened layer 62 of the corner 61 and the unhardened brake rotor mounting surface 59 due to a difference in hardness therebetween.

SUMMARY OF THE INVENTION

It is an object of the present invention to provide a vehicle wheel bearing apparatus for a vehicle which increases the strength and durability of the wheel hub under rotary bending conditions as well as lightening it without changing the configuration and dimension of the wheel mounting flange and without causing surface run-out problems.

To achieve objects of the present invention, a vehicle wheel bearing apparatus comprises an outer member formed with double row outer raceway surfaces on its inner peripheral surface. An inner member is formed with double row inner raceway surfaces arranged opposite the double row outer raceway surfaces. Double row rolling elements are freely rollably contained between the outer and inner raceway surfaces, respectively, of the outer and inner members. A wheel mounting flange is integrally formed with either one of the outer or inner members. At least one of the outer and inner members, on which the wheel mounting flange is formed, is heat treated. The raceway surfaces are hardened by quenching to a predetermined surface hardness.

According to the present invention, it is possible to increase the strength and durability against rotary bending fatigue by heat treating at least one of the outer and inner members with the wheel mounting flange. This is accomplished by quench hardening the raceway surfaces of the outer and/or inner members to a predetermined surface hardness without changing the configuration and dimension of the wheel mounting flange as well as currently used manufacturing methods and equipment.

According to the invention, the inner member comprises a wheel hub having the wheel mounting flange and an inner ring press fitted onto the wheel hub. An inner raceway surface, corresponding to one of the double row outer raceway surfaces of the outer member, is directly formed on the outer peripheral surface of the wheel hub. Another inner raceway surface, corresponding to the other of the double row outer raceway surfaces of the outer member, is formed on the outer peripheral surface of the inner ring. Thus, it is possible to miniaturize and lighten the bearing apparatus as well as to increase the strength and durability of the heat treated wheel hub.

According to the invention, the surface hardness of the base portion of outboard side of the wheel mounting flange is set below 35 HRC. Thus, it is possible to improve cutting to suppress the deformation due to heat treatment. This prevents deterioration of surface run-out of the wheel mounting flange caused by the deformation due to heat treatment. In addition, since hub bolt apertures are not hardened, it is possible to prevent serrations of hub bolts from the bolt apertures.

According to the invention, the end of inboard side of the hub wheel is plastically deformed radially outward to form a caulked portion to axially secure the inner ring relative to the wheel hub. Since this so-called self-retaining structure does not require to control the amount of preload applied to the inner ring by fastening nuts, as usually carried out in the prior art, it is possible to obtain ease of assembly to a vehicle body and to maintain the amount of long term preload.

It is preferable that the surface hardness of the caulked portion is set below 25 HRC. This occurs by tempering it after the heat treatment. This makes it possible to suppress hardness variation in the caulked portion compared to portions not heat treated after forging as in the prior art. In addition, it is possible to improve quality while reducing micro-cracks which are generated by plastic working.

According to the invention, since seals are arranged on two ends of the outer member. The base portion of the inboard side of the wheel mounting flange is formed with a seal land portion. A seal lip of the outboard side seal slidably contacts the sea land portion. The surface hardness of the seal land portion is set at 54~64 HRC. This improves the wear resistance and increases the mechanical strength against rotary bending load applied to the wheel mounting flange. Thus, this further improves the strength and durability of the wheel hub.

According to the invention, the inner member and the outer member are made of medium carbon steel including carbon of 0.40~0.80% by weight. This is advantageous in forging, cutting, and heat treatment especially in high frequency induction hardening.

According to the invention, a vehicle wheel bearing apparatus comprises an outer member formed with double row outer raceway surfaces on its inner peripheral surface. An inner member is formed with double row inner raceway surfaces arranged opposite the double row outer raceway surfaces. Double row rolling elements are freely rollably contained between the outer and inner raceway surfaces, respectively, of the outer and inner members. A wheel mounting flange is integrally formed with either one of the outer or inner members. The base portion of outboard side of the wheel mounting flange is heat treated and its surface hardness is set below 40 HRC. This eliminates cutting by lathe turning and increases the mechanical strength of the base portion.

According to the invention, the inner member comprises a wheel hub with a wheel mounting flange and an inner ring press fitted onto the wheel hub. An inner raceway surface, correspondingly opposed to one of the double row outer raceway surfaces of the outer member, is directly formed on the outer peripheral surface of the wheel hub. Another inner raceway surface, correspondingly opposed to the other of the double row outer raceway surfaces of the outer member, is formed on the outer peripheral surface of the inner ring. Thus, it is possible to miniaturize and lighten the bearing apparatus and to increase the strength of the base portion on the inboard side of the wheel mounting flange.

According to the invention, the end of inboard side of the wheel hub is plastically deformed radially outward to form a caulked portion to axially secure the inner ring relative to the wheel hub. Thus, this provides a so-called self-retaining structure.

According to the invention, seals are arranged on two ends of the outer member. The base portion on the inboard side of the wheel mounting flange is formed with a seal land portion. A seal lip of the outboard side seal slidably contacts the seal land portion. The surface hardness of the seal land portion is set at 54~64 HRC. Thus, it is possible to improve the wear resistance to increase the mechanical strength against rotary bending load applied to the wheel mounting flange and to further improve the strength and durability of the wheel hub.

According to the invention, the inner member and the outer member are made of medium carbon steel including carbon of 0.40~0.80% by weight. This structure is advantageous in forging, cutting, and heat treatment especially in high frequency induction hardening.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
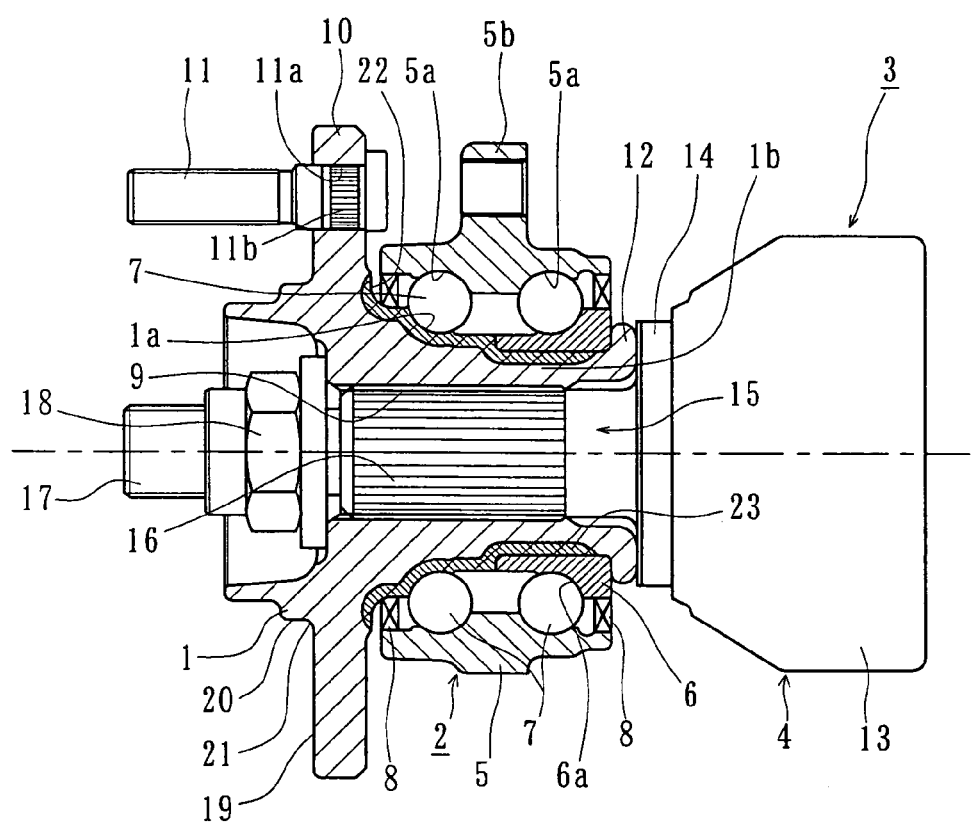
FIG. 1 is a longitudinal section view of a first embodiment of the wheel bearing apparatus of the present invention.

FIG. 1 shows a first embodiment of a vehicle wheel bearing apparatus of the present invention. In the description below, a term "outboard side" of the apparatus denotes a side which is positioned outside of the vehicle body and a term "inboard side" of the apparatus denotes a side which is positioned inside of the body when the bearing apparatus is mounted on the vehicle body.

The illustrated bearing apparatus is used for a vehicle driving wheel where a wheel hub 1 and a double row rolling bearing 2 are assembled as a unit. An outer joint member 4 of the constant velocity universal joint 3 is fitted on to the wheel hub 1 via serration engagement so as to transmit a torque therebetween.

The double row rolling bearing 2 comprises, as its main components, an outer member 5, the wheel hub 1, inner ring 6, double row rolling elements 7 and seals 8. The outer member 5 has double row outer raceway surfaces 5a and 5a formed on its inner peripheral surface. A body mounting flange 5b, to be mounted on a vehicle body (not shown), is integrally formed on an outer peripheral surface of the outer member 5.

One of double row inner raceway surfaces, correspondingly opposed to the outer raceway surfaces 5a and 5a, inner raceway surface 1a is directly formed on the outer periphery surface of the wheel hub 1. An inner ring 6 is press fitted onto a stepped portion of small diameter 1b of the wheel hub 1. The inner ring 6 is formed with another inner raceway surface 6a.

Double row rolling elements 7 and 7 are contained between the outer raceway surfaces 5a and 5a and the inner raceway surfaces 1a and 6a. The rolling elements 7 and 7 are freely rollably held by cages (not shown). Seals 8 and 8 are arranged at the ends of the double row rolling bearing 2 to prevent leakage of grease contained within the bearing 2 as well as ingress of rain water or dust.

The wheel hub 1 is formed with a serration (or spline) 9 on its inner peripheral surface for torque transmission. A wheel mounting flange 10, for mounting a wheel (not shown), is integrally formed on its outer peripheral surface at the end of the outboard side. Hub bolt holes to secure the wheel on the flange 10 are equidistantly arranged along the periphery of the flange 10.

In this bearing apparatus, a caulked portion 12 is formed by plastically deforming radially outward an end of the stepped portion 1b of small diameter of the wheel hub 1 after the inner ring 6 is press fit onto the stepped portion 1b. The double row rolling bearing 2 is formed as a unit by axially securing the inner ring 6 relative to the wheel hub 1 by the caulked portion 12. Due to this united structure of the bearing apparatus, it is possible to provide a vehicle wheel bearing apparatus of a so called third generation having a so-called self-retaining structure which controls the preload of the bearing 2 without using any fastening means, such as a nut. The illustrated ball rolling elements 7 and 7 may be replaced, for example, by conical rolling elements.

The constant velocity universal joint 3 comprises an outer joint member 4, an inner joint member (not shown), torque transmitting balls contained between the inner and outer joint members, and cages to hold the torque transmitting balls equidistantly along a circle. The outer joint member 4 comprises a cup-shaped mouth portion 13, a shoulder 14, that forms the bottom of the mouth portion 13, and a stem portion 15 which axially extends from the shoulder 14. Serrations (splines) 16 are formed on the outer peripheral surface of the stem portion 15. A male thread 17 is formed on the end of the stem.

Torque can be transmitted between the outer joint member 4 and the wheel hub 1 by engaging the serrations 9 of the wheel hub 1 with the serrations 16 of the stem portion by inserting the stem portion 15 into the wheel hub 1. The constant velocity universal joint 3 can be detachably secured to the double row rolling bearing 2 by fastening the end of the stem portion 15, via a nut 18, with the end face of the shoulder 14 abutted to the caulked portion 12 of the wheel hub 1.

The wheel hub 1 is made of medium carbon steel such as S53C which includes carbon of 0.40~0.80% by weight. The steel wheel hub is heat treated as hereinafter described after hot forging and finally formed to a predetermined configuration and dimension by lathe turning. The base portion of the wheel mounting flange 10 at the outboard side includes a corner 21 which extends from the brake rotor mounting surface 19 to a pilot portion 20. This forms a supporting surface of the brake rotor (not shown). The corner is formed as a circular arc (or an undercut) having a radius of curvature which does not cause an interference of the brake rotor.

The wheel hub 1 is heat treated so that the material forming the wheel hub is tempered at high temperature above 400° after forging to change the metallographic structure to troostite or sorbite. The metallographic structure of the wheel hub 1 is granulated by this heat treatment and thus the ductility and toughness is increased due to the increase of mechanical characteristics such as tension, bending and impact values. Although it is known that the mechanical strength can be increased by increasing the surface hardness, the surface hardness of the wheel hub 1 after the heat treatment is suppressed below 35 HRC in this embodiment. Thus, the surface hardness of the hub wheel 1 is set above 35 HRC, the cutting workability is lowered and the deformation due to heat treatment becomes large. Accordingly, the accuracy of surface run-out of the brake rotor mounting surface of the wheel mounting flange 10 is lowered as well as the life of a bite is shortened due to increase of surface hardness. Other reasons are that the surface hardness of the bolt apertures 11a into which hub bolts 11 are inserted approach the hardness of the hub bolts 11 which leads to serration of the hub bolts 11.

In addition, if the surface hardness of the wheel hub 1 at the inboard side is set above 35 HRC, micro-cracks would occur on the surface of the caulked portion 12 when it is formed by plastic deformation. It is preferable to set the surface hardness low in view of plastic working. Thus, the reliability of the caulked portion 12 is improved by setting its surface hardness below 25 HRC by carrying out high frequency tempering after the heat treatment of the caulked portion 12. Furthermore, this makes it possible to suppress hardness variation in the caulked portion as compared with portions not heat treated after forging as in the prior art. In addition it is possible to improve its quality while reducing micro-cracks which would be generated by plastic working.

This enables strengthening of the corner of the flange where the rotary bending strength is weakened and thus increases the durability of the wheel hub using current method and facility without change to the configuration and dimension of the wheel mounting flange 10. It is possible to further improve the accuracy of the surface run-out of the brake rotor mounting surface 19 by carrying out the lathe turning after forging and heat treatment processes.

Although it has described that the heat treatment of the wheel hub 1 after forging is carried out by the all surface heat treatment method in which heat treatment of the wheel hub 1 is carried out in a heat treatment furnace it is possible to adopt the partial surface heat treatment in which, for example, only the inboard side end of the wheel hub 1 corresponding to the caulked portion 12 as well as the corner 21 of the wheel mounting flange 10 are heated by the high frequency induction hardening. In this case, it is unnecessary to consider the workability, such as ease of cutting, and it is possible to set the surface hardness of predetermined portions at desired hardness. Thus, the surface hardness of the corner 21 may be set below 40 HRC and the surface of the caulked portion 12 below HRC 25.

The wheel hub 1 is formed with hardened layer 23 (shown by cross-hatching in drawings) having a surface hardness of 54~64 HRC. The hardened layer 23 is formed by high frequency induction hardening at the inner raceway surface 1a, of the outboard side, the seal land portion 22, with which a sealing means 8 contacts, and the stepped portion 1b of small diameter. Thus, the seal land portion 22 not only has an improved wear resistance but provides a large mechanical strength to the wheel hub 1 against rotary bending load applied to the wheel mounting flange 10. The inner ring 6 is made of high carbon chrome bearing steel such as SUJ 2 and is hardened to its core by dip quenching to have the surface hardness of HRC 54~64.

On the other hand, the outer member 5 is made of medium carbon steel including carbon of 0.40~0.80% by weight such as S53C. The double row outer raceway surfaces 5a and 5a as well as the inner peripheral surface where the sealing means 8 and 8 are fitted, are hardened by high frequency induction quenching to have a surface hardness of 54~64 HRC.

Although it is described that manufacturing method of the wheel hub 1 has steps of forging→heat treatment→lathe turning→high frequency induction quenching, it is possible to appropriately change the order in accordance with the manufacturing line structure. For example, the steps may be forging→lathe turning→heat treatment→high frequency induction quenching.

Figure 2:
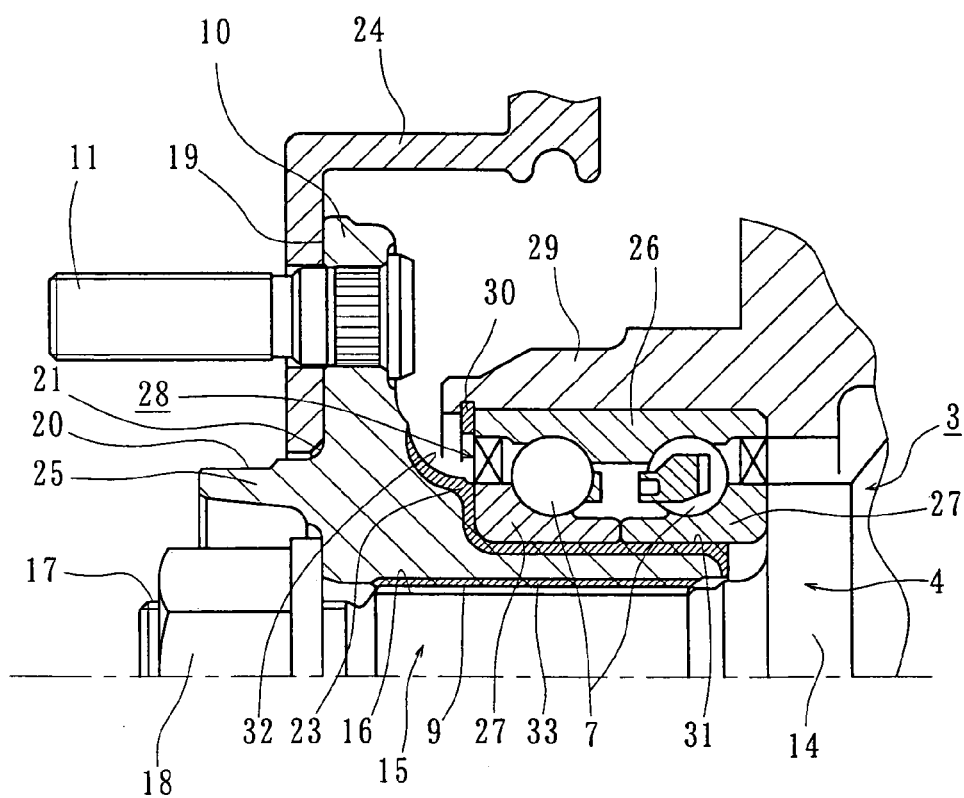
FIG. 2 is a longitudinal section view of a second embodiment of the wheel bearing apparatus of the present invention.

FIG. 2 is a longitudinal view showing a second embodiment of the wheel bearing apparatus of the present invention. This embodiment shows a bearing apparatus for a wheel of first generation. Same reference numerals are used to designate the same parts having the same functions used in the first embodiment.

The wheel bearing apparatus has as its main components a hub wheel 25 to secure the brake rotor 24 and a wheel (not shown). The bearing 28 for a wheel has the double row rolling elements (balls) 7 and 7 freely rollably contained between the inner and outer members 27 and 26. A knuckle 29 supports the bearing 28 on the body of vehicle. The constant velocity universal joint 3 is connected to the wheel hub 25 to transmit power from the drive shaft (not shown) to the wheel hub 25. The illustrated ball rolling elements 7 and 7 may be replaced for example by conical rolling elements.

The outer wheel 26 of the bearing 28, fitted in the knuckle 29, is axially secured by a snap ring 30. On the other hand, a pair of inner ring 27 and 27 are press fit onto the cylindrical stepped portion 31 of small diameter formed on the wheel hub 25. The constant velocity universal joint 3 is detachably secured to the bearing 28 by fastening the end of the stem portion 15, via a nut 18, with the end of larger diameter of the inner ring 27 on the inboard side abutting the shoulder 14.

The wheel hub 25 is made of medium carbon steel such as S53C including carbon of 0.40~0.80% by weight. All surfaces are heat treated after hot forging below 35 HRC. This enables strengthening of the corner 21 of the flange where rotary bending strength is weakened without change to the configuration and dimension of the wheel mounting flange 10.

The base portion 32 of the inboard side of the wheel mounting flange 10 of the wheel hub 25 has a radius of curvature defined as large as possible. The mounting flange 10 is formed with hardened layer 23 (shown by cross-hatching in drawings), having a surface hardness of 54~64 HRC, by high frequency induction hardening from the base portion 32 to the stepped portion 31 of small diameter. Thus, the wheel hub 25 has a sufficiently large mechanical advantage against the rotary bending load applied to the wheel mounting flange 10.

The pair of inner rings 27 and 27 are made of high carbon chrome bearing steel such as SUJ 2 and is hardened to its core by dip quenching to have the surface hardness of HRC 54~64. The provision of the predetermined hardened layer 23 makes it possible to suppress, at lowermost level, the fretting wear caused on the fitted surfaces between the stepped portion 31 of small diameter and the inner rings 27 and 27. Accordingly, generation of rust, wear or scratches which would be caused by the fretting wear at the fitted surfaces of the inner ring 27 and 27, is also prevented and the durability of the inner rings is improved. The surfaces of serrations 9 formed on the inner peripheral surface of the wheel hub 25 are also formed with hardened layer 23, (shown by cross-hatching in drawings) having a surface hardness 54~64 HRC, by high frequency induction hardening. Thus the wear resistance of the serrations 9 is improved and the effective length of serrations 9 can be reduced due to its increased strength. This contributes to miniaturization and lightening of the wheel hub 25. On the other hand, the inner ring 6 is made of high carbon chrome bearing steel such as SUJ 2 and is hardened to its core by dip quenching to have the surface hardness of HRC 54~64.

Figure 3:
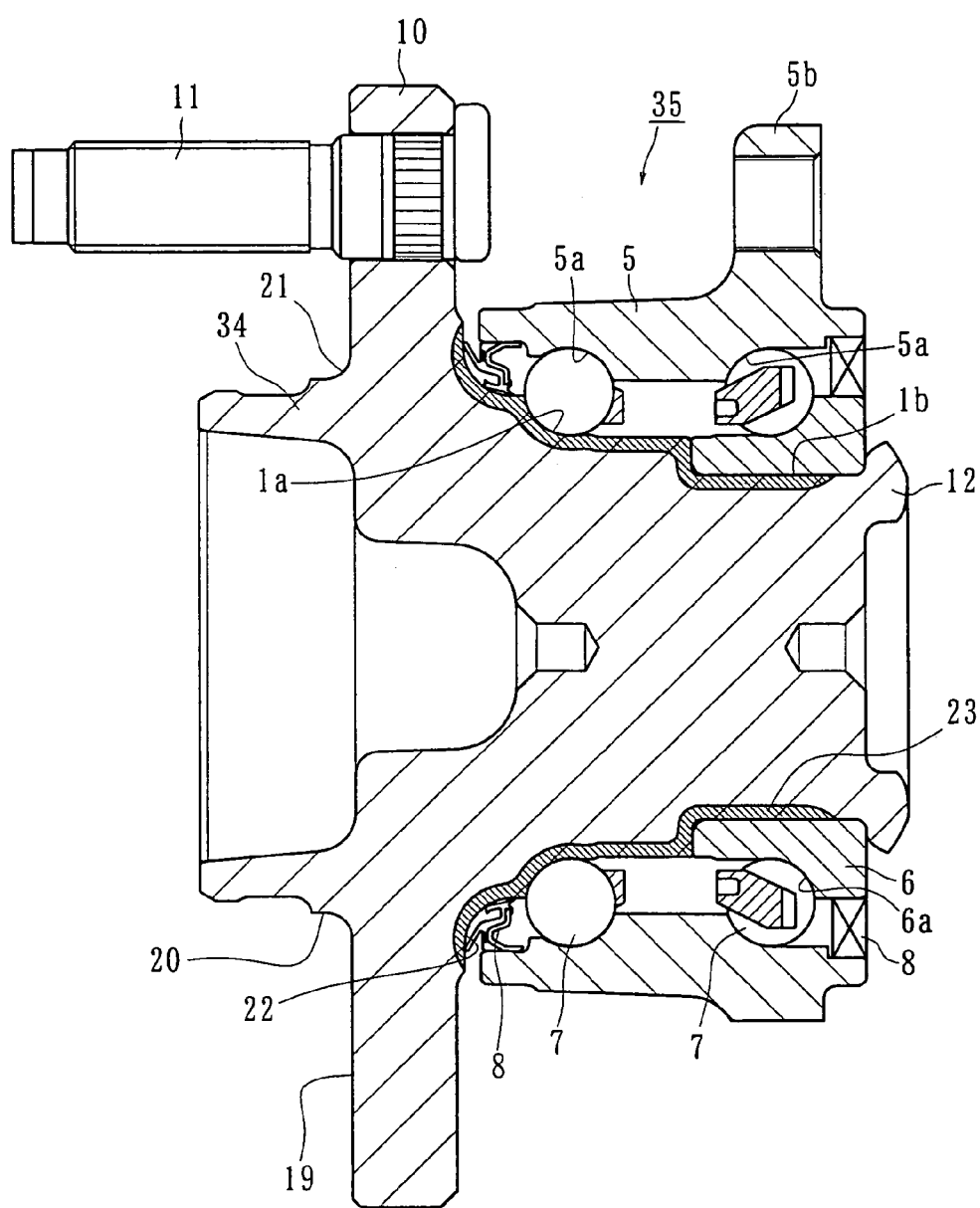
FIG. 3 is a longitudinal section view of a third embodiment of the wheel bearing apparatus of the present invention.
Figure 4:
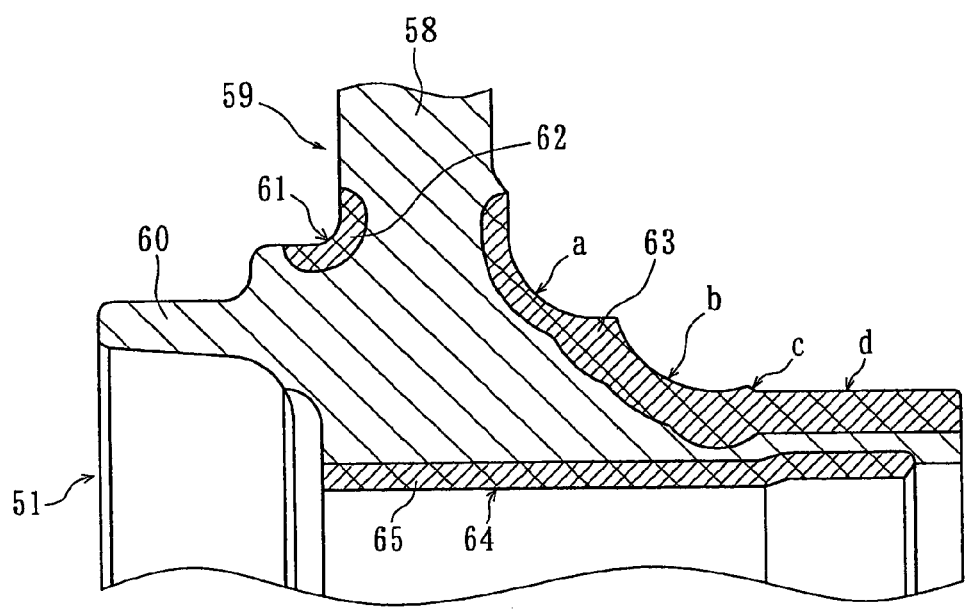
FIG. 4 is a longitudinal section view of a prior art wheel bearing apparatus.
Figure 5:
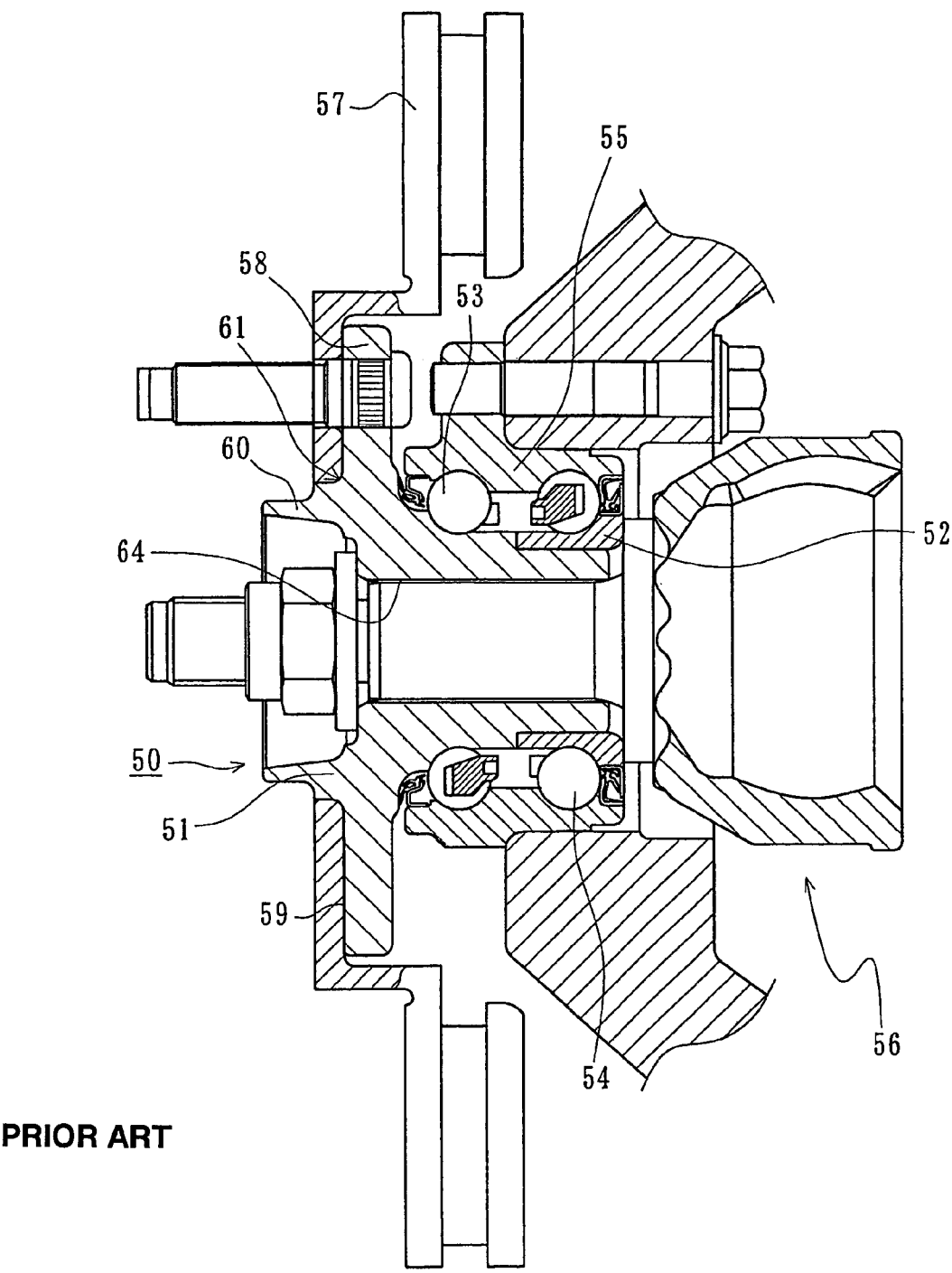
FIG. 5 is a longitudinal section view of another prior art wheel bearing apparatus.

FIG. 3 is a longitudinal view showing a third embodiment of the wheel bearing apparatus of the present invention. This embodiment shows a bearing apparatus for a wheel of third generation. The same reference numerals are used to designate the same parts that have the same functions used in the first embodiment.

The bearing apparatus is that used for a driven wheel and has a unit construction where the wheel hub 34 and double row rolling bearing 35 are assembled as a unit. The double row rolling bearing 35 comprises, as its main components, the outer member 5, the hub wheel 34, the inner ring 6 press fit onto the stepped portion 1*b* of small diameter of the hub wheel 34, and the double row rolling elements 7 and 7.

In this bearing apparatus, a caulked portion 12 is formed by plastically deforming radially outward the end of the stepped portion 1*b* of small diameter of the hub wheel 34 after the inner ring 6 is press fit onto the stepped portion 1*b*. The double row rolling bearing 35 is formed as a unit by axially securing the inner ring 6 relative to the hub wheel 34 by the caulked portion 12. Due to this united structure of the bearing apparatus, it is possible to provide a bearing apparatus for a vehicle wheel of third generation with a so-called self-retaining structure which controls the preload of the bearing 35 without using any fastening means, such as a nut.

The hub wheel 34 is made of medium carbon steel such as S53C including carbon of 0.40~0.80% by weight. All surfaces are heat treated after hot forging and the surface hardness is set below 35 HRC. This enables strengthening of the corner of the flange where the rotary bending strength is weakened and increases the durability of the wheel hub without change to the configuration and dimension of the wheel mounting flange 10.

The base portion on the inboard side of the wheel mounting flange 10 of the hub wheel 34 forms the seal land portion 22 of the outboard side seal 8. Its radius of curvature is defined as large as possible. The hardened layer 23 (shown by cross-hatching in drawings) has a surface hardness of 54~64 HRC formed by high frequency induction hardening. The layer 23 is formed from the seal land portion 22 to the stepped portion 1*b* of small diameter. Thus, the wear resistance of the seal land portion 22 is increased. Also, the seal land portion 22 has a sufficiently large mechanical advantage against rotary bending load applied to the wheel mounting flange 10 and thus, improves durability of the wheel hub 34.

Although it is shown in this third embodiment that the wheel hub 34 is integrally formed with the wheel mounting flange 10, it is known that the third embodiment is applicable to a bearing apparatus of outer ring rotation type where the wheel mounting flange 10 is integrally formed with the outer member.

As described above, according to the present invention, the vehicle wheel bearing apparatus comprises an outer member formed with double row outer raceway surfaces on its inner peripheral surface. An inner member is formed with double row inner raceway surfaces arranged opposite to the double row outer raceway surfaces. Double row rolling elements are freely rollably contained between the outer and inner raceway surfaces, respectively, of the outer and inner members. A wheel mounting flange is integrally formed with either one of the outer or inner members. At least one of the outer and inner members on which the wheel mounting flange is formed is heat treated. Their raceway surfaces are hardened by quenching to a predetermined surface hardness. Thus, it is possible to ensure a desired bearing life and also to increase the strength and durability of the wheel hub against rotary bending fatigue using current methods and facilities without change to the configuration and dimension of the wheel mounting flange.

Further, according to the present invention, the vehicle wheel bearing apparatus comprises an outer member formed with double row outer raceway surfaces on its inner peripheral surface. An inner member is formed with double row inner raceway surfaces arranged opposite to the double row outer raceway surfaces. Double row rolling elements are freely rollably contained between the outer and inner raceway surfaces, respectively, of the outer and inner members. A wheel mounting flange is integrally formed with either one of the outer or inner member. The base portion of outboard side of the wheel mounting flange is heat treated. Its surface hardness is set at 40 HRC or less. Also, it is unnecessary to consider the cutting workability, such as lathe turning, and possible to improve the mechanical strength of the base portion of the wheel mounting flange.

The present invention has been described with reference to the preferred embodiments. Obviously, modifications and alternations will occur to those of ordinary skill in the art upon reading and understanding the preceding detailed description. It is intended that the present invention be construed as including all such alternations and modifications insofar as they come within the scope of the appended claims or the equivalents thereof.

What is claimed is:

1. A vehicle wheel bearing apparatus comprising:
   an outer member formed with double row outer raceway surfaces on an inner peripheral surface;
   an inner member formed with double row inner raceway surfaces arranged opposite to the double row outer raceway surfaces;
   double row rolling elements freely rollably contained between the outer and inner raceway surfaces, respectively, of the outer and inner members; and
   a wheel mounting flange integrally formed with either one of the outer or inner members which are thermally refined, at least one of the outer and inner members on which the wheel mounting flange is formed and is quenched after being thermally refined on a base portion on an outboard side of the mounting flange to increase strength and durability against rotary bending fatigue, said thermally refining hardening said outboard side base portion of the mounting flange at said outer or inner member to a first surface hardness, and hardening said raceway surfaces by quenching to a second predetermined surface hardness wherein the second surface hardness is greater than the first surface hardness.

2. The bearing apparatus of claim 1, wherein the surface hardness of the base portion of the outboard side of the wheel mounting flange is set below 35 HRC.

3. The bearing apparatus of claim 1, wherein the inner member and the outer member are made of medium carbon steel including carbon of 0.40~0.80% by weight.

4. The bearing apparatus of claim 1, wherein the inner member comprises a wheel hub having the wheel mounting flange and an inner ring press fit onto the wheel hub, an inner raceway surface corresponding to one of the double row outer raceway surfaces of the outer member is directly formed on the outer peripheral surface of the wheel hub, and another inner raceway surface corresponding to the other of the double row outer raceway surfaces of the outer member is formed on the outer peripheral surface of the inner ring.

5. The bearing apparatus of claim 4, wherein the end of the inboard side of the wheel hub is plastically deformed radially outward to form a caulked portion for axially securing the inner ring relative to the hub wheel.

6. The bearing apparatus of claim 5, wherein the surface hardness of the caulked portion is set below 25 HRC by tempering it after the heat treatment.

7. The bearing apparatus of claim 4, wherein seals are arranged on two ends of the outer member, the base portion of an inboard side of the wheel mounting flange is formed with a seal land portion, a seal lip of an outboard side seal slidably contacts said seal land portion, and the surface hardness of the seal land portion is set at 54~64 HRC.

8. A vehicle wheel bearing apparatus comprising:
   an outer member formed with double row outer raceway surfaces on an inner peripheral surface;
   an inner member formed with double row inner raceway surfaces arranged opposite to the double row outer raceway surfaces;
   double row rolling elements freely rollably contained between the outer and inner raceway surfaces, respectively, of the outer and inner members; and
   said inner member comprises a wheel hub having a wheel mounting flange and an inner ring press fit onto the wheel hub;
   all surfaces of the inner member on which the wheel mounting flange is formed are thermally refined by tempering after forging of the inner member to change the metallographic structure;
   the surface of the inner member where the inner ring is fit onto the wheel hub is formed with a surface hardened layer by high frequency induction hardening after said thermal refining of said inner member;
   said inner raceway surfaces are hardened by quenching after said thermal refining of said member; and
   said inner raceway surfaces are hardened by quenching after said thermal refining of said inner member; and
   said outer raceway surface are hardened by quenching of said outer member.

9. The bearing apparatus of claim 8, wherein the surface hardness of the base portion of the outboard side of the wheel mounting flange is set below 35 HRC.

10. The bearing apparatus of claim 8, wherein the inner member and the outer member are made of medium carbon steel including carbon of 0.40~0.80% by weight.

11. The bearing apparatus of claim 8, wherein an inner raceway surface corresponding to one of the double row outer raceway surfaces of the outer member is directly formed on the outer peripheral surface of the wheel hub, and another inner raceway surface corresponding to the other of the double row outer raceway surfaces of the outer member is formed on the outer peripheral surface of the inner ring.

12. The bearing apparatus of claim 11, wherein the end of the inboard side of the wheel hub is plastically deformed radially outward to form a caulked portion for axially securing the inner ring relative to the hub wheel.

13. The bearing apparatus of claim 12, wherein the surface hardness of the caulked portion is set below 25 HRC by tempering it after the heat treatment.

14. The bearing apparatus of claim 11, wherein seals are arranged on two ends of the outer member, the base portion of an inboard side of the wheel mounting flange is formed with a seal land portion, a seal lip of an outboard side seal slidably contacts said seal land portion, and the surface hardness of the seal land portion is set at 54~64 HRC.

* * * * *